United States Patent
Fu et al.

(10) Patent No.: US 11,146,362 B2
(45) Date of Patent: Oct. 12, 2021

(54) INTERNET OF THINGS DATA TRANSMISSION METHOD, DEVICE AND SYSTEM

(71) Applicant: HUAWEI TECHNOLOGIES CO., LTD., Shenzhen (CN)

(72) Inventors: Baicheng Fu, Shenzhen (CN); Zhen Cao, Beijing (CN); Ke Jin, Shenzhen (CN); Fei Zheng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/899,046

(22) Filed: Jun. 11, 2020

(65) Prior Publication Data

US 2020/0304240 A1    Sep. 24, 2020

Related U.S. Application Data

(63) Continuation of application No. PCT/CN2018/109014, filed on Sep. 30, 2018.

(30) Foreign Application Priority Data

Dec. 15, 2017    (CN) .......................... 201711349410.7

(51) Int. Cl.
   *H04L 1/18*    (2006.01)
   *H04L 1/00*    (2006.01)
   (Continued)

(52) U.S. Cl.
   CPC ............ *H04L 1/1809* (2013.01); *H04L 1/008* (2013.01); *H04L 1/188* (2013.01); *H04L 67/12* (2013.01); *H04L 69/16* (2013.01)

(58) Field of Classification Search
   CPC ....... H04L 1/1809; H04L 1/008; H04L 1/188; H04L 67/12; H04L 69/16
   See application file for complete search history.

(56) References Cited

U.S. PATENT DOCUMENTS 9,468,001 B2 * 10/2016 Agardh ............ H04W 74/0808
9,571,365 B2 *  2/2017 Iizuka ................. H04L 43/0829
(Continued)

FOREIGN PATENT DOCUMENTS

CN    101197778 A    6/2008
CN    102685204 A    9/2012
(Continued)

OTHER PUBLICATIONS

Choi et al., Gyuhong: "Efficient streaming over CoAP", 2016 International Conference on Information Networking (ICOIN), IEEE, Jan. 13, 2016, pp. 476-478, XP032877462.
(Continued)

Primary Examiner — Chandrahas B Patel
(74) Attorney, Agent, or Firm — Hauptman Ham, LLP

(57) ABSTRACT

An Internet of Things data transmission method includes sending, by a terminal device, a first data request to a server, and continuously receiving, by the terminal device, N data packets from the server. The first data request instructs the server to continuously send a plurality of data packets. The first data request includes a quantity N of data packets, that the terminal device is capable of continuously receiving, and a time interval for sending two consecutive data packets, where N is an integer greater than 1. The N data packets include at least one non-confirmable Constrained Application Protocol (NON) data packet, a sending time interval between two consecutive data packets in the N data packets and the at least one NON data packet indicates that sending a receiving response from the terminal device to the server is unnecessary.

20 Claims, 10 Drawing Sheets

(51) Int. Cl.
*H04L 29/08* (2006.01)
*H04L 29/06* (2006.01)

(56) References Cited

U.S. PATENT DOCUMENTS

| | | | | |
|---|---|---|---|---|
| 10,225,761 | B2 * | 3/2019 | Streijl | H04L 47/127 |
| 10,749,711 | B2 * | 8/2020 | Mukundan | H04L 43/028 |
| 2014/0105063 | A1 * | 4/2014 | Jeong | H04W 24/02 |
| | | | | 370/254 |
| 2017/0094593 | A1 | 3/2017 | Deng et al. | |
| 2018/0183719 | A1 * | 6/2018 | Xie | H04L 65/602 |

FOREIGN PATENT DOCUMENTS

| | | |
|---|---|---|
| CN | 102932392 A | 2/2013 |
| CN | 104852785 A | 8/2015 |
| CN | 105634692 A | 6/2016 |
| CN | 106230882 A | 12/2016 |
| WO | 2013127437 A1 | 9/2013 |
| WO | 2016210109 A1 | 12/2016 |
| WO | 2017040948 A1 | 3/2017 |

OTHER PUBLICATIONS

Loreto et al., S: "CoAP Streaming; draft-loreto-core-coap-streaming-00.txt", Mar. 27, 2012, pp. 1-9, XP015082193.
European Search Report issued in corresponding European Patent Application No. 18888322.7, dated Dec. 23, 2020, pp. 1-10, European Patent Office, Munich, Germany.
C. Bormann et al. Block-Wise Transfers in the Constrained Application Protocol (CoAP), RFC7959, Aug. 2016. total 37 pages.
Chinese Office Action issued in corresponding Chinese Application No. 201711349410.7, dated Mar. 4, 2020, pp. 1-6, The State Intellectual Property Office of People's Republic of China, Beijing, China.
International Search Report issued in corresponding International Application No. PCT/CN/2018/109014, dated Dec. 28, 2018, pp. 1-8, The State Intellectual Property Office of People's Republic of China, Beijing, China.

* cited by examiner

| Number | Key filed C or not | Safe or unsafe U | Cacheable or non-cacheable N | Reserved R or not | Name | Format | Length |
|---|---|---|---|---|---|---|---|
| xx | C | U | - | - | NONACK | Binary data | 8 |

FIG. 7

| 0 1 2 3 4 5 6 7 | |
|---|---|
| Option delta (option delta) | Option length (option length) |
| Option delta extended (option delta extended) | |
| Option length extended (option length extended) | |
| Option value (option value) | |

1 byte 0 to 2 bytes 0 to 2 bytes 0 to a plurality of bytes

INTERNET OF THINGS DATA TRANSMISSION METHOD, DEVICE AND SYSTEM

CROSS-REFERENCE TO RELATED APPLICATIONS

This application is a continuation of International Application No. PCT/CN2018/109014, filed on Sep. 30, 2018, which claims priority to Chinese Patent Application No. 201711349410.7, filed on Dec. 15, 2017. The disclosures of the aforementioned applications are hereby incorporated by reference in their entireties.

TECHNICAL FIELD

Embodiments of this application relate to the field of Internet of Things, and in particular, to an Internet of Things data transmission method, a device, and a system.

BACKGROUND

The Internet of Things (IoT) is an important part of a new generation of information technology, and is also an important development stage in the "informatization" age. The Internet of Things is the Internet through which things are connected. Compared with the Internet, the Internet of Things mainly has the following features: (1) There are a very large quantity of nodes; (2) Many Internet of Things devices are very small, and have very limited resources such as memories, CPUs, and electric energy; (3) A network environment fluctuates greatly, and a packet loss possibility is relatively high; and (4) UE usually has mobility, and is powered by a battery.

A common solution used to transmit large blocks of data in a current Internet of Things device is a block transmission solution that is based on the Constrained Application Protocol (CoAP). This solution is mature and reliable. In the block transmission solution, data is divided into a plurality of data blocks for transmission. A terminal and a server relatively frequently interact with each other. Therefore, data transmission efficiency is relatively low, and power consumption is relatively high.

SUMMARY

Embodiments of this application provide a data transmission method in a new Internet of Things, to improve Internet of Things data transmission efficiency by reducing packet exchange in a data block download process, and reduce power consumption in a data transmission process.

In a general embodiment of this application, when a terminal device (or referred to as a client) requests a server for the first data block, a new option is carried, and includes a maximum quantity N of consecutive data packets that can be received in parallel or a data packet sequence number, and a time interval T. The server actively pushes one data block to the terminal device at the time interval. The data block is carried in a data packet, and is sent to the terminal device in a form of the data packet, until all of the N data blocks are sent. Therefore, the terminal device does not need to send a data request to the server for each data block, thereby reducing a quantity of data requests and frequency of sending data requests, and improving efficiency of data transmission between the terminal device and the server.

According to a first aspect, an Internet of Things system provided in an embodiment of this application includes a terminal device and a server. There may be a plurality of terminal devices, and the server may be a server cluster. The terminal device is configured to send a first data request to the server, where the first data request is used to instruct the server to continuously send a plurality of data packets, and the first data request includes a quantity N of data packets that the terminal device is capable of continuously receiving and a sending time interval T between two consecutive data packets. The server is configured to continuously send N data packets to the terminal device based on the first data request, where the N data packets include at least one non-confirmable Constrained Application Protocol (NON confirmable CoAP, NON) data packet, a sending time interval between two consecutive data packets in the N data packets is the time interval T, and the NON data packet is a data packet indicating that the terminal device does not need to send a receiving response to the server In other words, the server automatically pushes a data packet without the need of receiving a response message of a previous data packet.

It should be noted that two consecutive data packets may be understood as that the server sends a data packet and continues to send another data packet without the need of waiting for a response to the data packet, for example, an $M^{th}$ data packet and an $(M+1)^{th}$ data packet in the N data packets, where M is greater than or equal to 1 and is less than or equal to N−1. For another example, two consecutive data packets may alternatively be understood as two adjacent data packets sent by the server. The adjacent data packets may be data packets adjacent in a sending queue of the serve. In an implementation, two consecutive data packets may be understood as two data packets having serial numbers.

In the Internet of Things system provided in this embodiment of this application, when the terminal device sends one data request, the server may continuously send a plurality of data packets through message exchange between the server and the terminal device, thereby reducing request packets in a data transmission process, improving Internet of Things data transmission efficiency, and reducing power consumption in the data transmission process.

Optionally, when the server continuously sends the N data packets to the terminal device. first N−1 data packets are NON data packets, and the last data packet is a confirmable Constrained Application Protocol (confirmable CoAP, CON) data packet. The terminal device is further configured to send a response message to the server based on the CON data packet, to notify the server that the terminal device is still in a receiving state. An objective of sending a CON data packet is to detect whether the terminal device has been offline. If the server cannot receive the response message of the terminal device, the server confirms that the terminal device has been offline, and stops pushing another data block, thereby avoiding wasting server resources.

Optionally, the first data request may further include a start number of the N data packets. The server is configured to continuously send, based on the first data request to the terminal device, the N data packets sequentially from a data packet with the start number.

Optionally, a maximum data quantity N of data packets allowed to be received by the terminal device is obtained after information is exchanged with the server. The terminal device is further configured to send a resource obtaining request to the server, where the resource obtaining request includes an identifier of a requested data resource. The server is further configured to send, to the terminal device based on the identifier of the data resource, a data amount of the data resource and a data amount that is of a part of the data resource and that is carried in each data packet used to carry the data resource. The terminal device is further configured to determine the quantity N of the data packets based on the data amount of the data resource and the data amount that is of the part of the data resource and that is carried in each data packet used to carry the data resource.

Optionally, reliability in a data block transmission process can be ensured by using a retransmission mechanism. The terminal device is further configured to: start, after receiving a data packet, a timer corresponding to a next data packet of the data packet, and send a retransmission request to the server when the timer expires but the next data packet is not received. The server is further configured to: after receiving the retransmission request, retransmit the next data packet to the terminal device.

Optionally, when a plurality of data packets are lost, a manner of sending data packet sequence numbers may be used, to request the server to send, one by one, data packets corresponding to the data packet sequence numbers. The terminal device is further configured to send a second data request to the server, where the second data request includes a data packet sequence number, and the data packet sequence number is used to indicate a data packet that is not received by the terminal device. The server is further configured to: after receiving the second data request, retransmit a data packet corresponding to the data packet sequence number The terminal device is further configured to receive the data packet that is sent by the server and that corresponds to the data packet sequence number, Therefore, retransmission efficiency is improved when the plurality of data packets are lost.

Optionally, either the first data request or the second data request may be sent in a Constrained Application Protocol option CoAP option, a Constrained Application Protocol query option CoAP query option, or a non-acknowledged option NONACK option.

According to a second aspect, an embodiment of this application further provides an Internet of Things data transmission method. The method includes:

sending, by a terminal device, a first data request to a server, where the first data request is used to instruct the server to continuously send a plurality of data packets, the first data request includes a quantity N of data packets that the terminal device is capable of continuously receiving and a time interval T for sending two consecutive data packets, and N is greater than 1; and subsequently, receiving, by the terminal device, N data packets sent by the server, where the N data. packets include at least one NON data packet, a sending time interval between two consecutive data packets in the N data packets is the time interval T and the NON data packet is a data packet indicating that the terminal device does not need to send a receiving response to the server.

In this embodiment, when the terminal device sends one data request, the server may continuously send a plurality of data packets, and the terminal device does not need to request the server to send a data block each time, thereby reducing request packets in a data transmission process, and improving Internet of Things data transmission efficiency.

Optionally, the last data packet in the N data packets is a CON data packet. Specifically, first N−1 data packets in the N data packets are NON data packets, and the last data packet is a CON data packet. The method further includes: sending, by the terminal device, a response message to the server after receiving the CON data packet, to notify the server that the terminal device is still in a receiving state and is not offline.

In some embodiments, the first data request further includes a start number of the N data packets, and the N data packets are data packets having increasing numbers from the start number.

Optionally, before sending the first data request to the server, the terminal device further sends a resource obtaining request to the server, to obtain a data resource, where the resource obtaining request includes an identifier of a requested data resource. Subsequently, the terminal device receives a data amount of the data resource sent by the server and a data amount that is of a part of the data resource and that is carried in each data packet used to carry the data resource; and then, determines the quantity N of the data packets based on the data amount of the data resource and the data amount that is of the pail of the data resource and that is carried in each data packet used to carry the data resource.

In some embodiments, the terminal device starts, after receiving a data packet, a timer corresponding to a next data packet of the data packet, and sends a retransmission request to the server when the timer expires but the next data packet is not received, where the retransmission request is used to instruct the server to retransmit the next data packet. In this way, reliability in a data transmission process can be ensured by using a retransmission mechanism.

Optionally, a value on the timer is calculated based on an average round trip time of receiving and sending data by the terminal device, an arrival rate of a data packet, and a remaining buffer size of the terminal device.

In some embodiments, the terminal device further sends a second data request to the server, where the second data request includes data packet sequence numbers, and the data packet sequence numbers are used to indicate data packets that are lost or not received by the terminal device. Subsequently, the terminal device receives a data packet that is retransmitted by the server based on the second data request and that corresponds to the data packet sequence number. In this way, when the terminal device loses a plurality of data packets, the plurality of data packets do not need to request to be retransmitted one by one, thereby reducing information exchange between the terminal device and the server.

Optionally, the first data request or the second data request may be sent in a CoAP option field, a CoAP query option field, or a NONACK option field.

According to a third aspect, an embodiment of this application further provides an Internet of Things data transmission method. The method includes:

receiving, by a server, a first data request sent by a terminal device, where the first data request includes a quantity N of data packets that the terminal device is capable of continuously receiving and a time interval T for sending two consecutive data packets, and N is greater than 1; and continuously sending, by the server, N data packets to the terminal device based on the first data request, where the N data packets include at least one NON data packet, a sending time interval between two consecutive data packets in the N data packets is the time interval T, and the NON data packet is a data packet indicating that the terminal device does not need to send a receiving response to the server.

In this embodiment, when the terminal device sends one data request, the server may continuously send a plurality of data packets, and the terminal device does not need to send a data block request to the server to perform exchange each time the terminal device receives a data block, thereby reducing request packets in a data transmission process, improving Internet of Things data transmission efficiency, and reducing power consumption of devices in an Internet of Things (IoT) data transmission process.

Optionally, the last data packet in the N data packets is a CON data packet. For example, first N−1 data packets in the N data packets are NON data packets, and the last data packet is a CON data packet. The CON data packet is used to instruct the terminal device to send a response message to the server, so that the server learns that the terminal device is still in a receiving state and is not offline. In this way, the server can be prevented from constantly sending data packets when the terminal device has been offline, thereby avoiding wasting server resources.

In some embodiments, the first data request further includes a start number of the N data packets. When sending the N data packets, the server continuously sends, to the terminal device, the N data packets sequentially from a data packet with the start number.

In some embodiments, before receiving the first data request sent by the terminal device, the server further receives a resource obtaining request sent by the terminal device, where the resource obtaining request includes an identifier of a requested data resource, and the server sends, to the terminal device based on the identifier of the data resource, a data amount of the data resource and a data amount that is of a part of the data resource and that is carried in each data packet used to carry the data resource, where the data amount of the data resource and the data amount that is of the part of the data resource and that is carried in each data packet used to carry the data resource are used by the terminal device to determine the quantity N of the data packets.

In some embodiments, the server further receives a second data request sent by the terminal device, where the second data request includes a data packet sequence number, to indicate a data packet that is not received by the terminal device, Subsequently, the server sends a data packet corresponding to the data packet sequence number to the terminal device. In this way, a plurality of data packets that are not received by the terminal device may be retransmitted once, thereby reducing information exchange in a data transmission process.

Optionally, the first data request or the second data request may be sent in a CoAP option field, a CoAP query option field, or a NONACK option field.

According to a fourth aspect, an embodiment of this application further provides an Internet of Things terminal device, which specifically implements functions implemented in the Internet of Things data transmission method according to the second aspect. The functions may be implemented by hardware, or may be implemented by hardware executing a corresponding software program. The hardware and the software include one or more unit modules corresponding to the foregoing functions. The unit module may be software and/or hardware.

In a possible design, the terminal device includes:
a sending module, configured to send a first data request to a server, where the first data request is used to instruct the server to continuously send a plurality of data packets, the first data request includes a quantity N of data packets that the terminal device is capable of continuously receiving and a time interval for sending two consecutive data packets, and N is greater than 1; and a receiving module, configured to receive N data packets continuously sent by the server, where the N data packets include at least one NON data packet, a sending time interval between two consecutive data packets in the N data packets is the time interval, and the NON data packet is a data packet indicating that the terminal device does not need to send a receiving response to the server.

In a possible design, the terminal device includes:
a memory, one or more processors, and one or more programs, where the one or more programs are stored in the memory, and the processor executes the one or more programs, to perform all or some steps according to the second aspect.

According to a fifth aspect, an embodiment of this application further provides a server, which specifically implements functions implemented in the Internet of Things data transmission method according to the third aspect. The functions may be implemented by hardware, or may be implemented by hardware executing a corresponding software program. The hardware and the software include one or more unit modules corresponding to the foregoing functions. The unit module may be software and/or hardware.

In a possible design, the server includes:
a receiving module, configured to receive a first data request sent by a terminal device, where the first data request includes a quantity N of data packets that the terminal device is capable of continuously receiving and a time interval for sending two consecutive data packets, and N is greater than 1; and
a sending module, configured to continuously send N data packets to the terminal device based on the first data request, where the N data packets include at least one NON data packet, a sending time interval between two consecutive data packets in the N data packets is the time interval, and the NON data packet is a data packet indicating that the terminal device does not need to send a receiving response to the server.

In a possible design, the server includes:
a memory, one or more processors, and one or more programs, where the one or more programs are stored in the memory, and the processor executes the one or more programs, to perform all or some steps according to the third aspect.

Another aspect of this application provides a computer-readable storage medium. The computer-readable storage medium stores an instruction, and when the instruction is run on a computer, the computer is caused to perform the method according to any one of the foregoing aspects.

Another aspect of this application provides a computer program product including an instruction, and when the computer program product is run on a computer, the computer is caused to perform the method according to any one of the foregoing aspects.

According to the solutions provided in the embodiments of this application, compared with a standard CoAP block transmission technology, request packets in a block transmission process are reduced, especially when there are a huge quantity of terminal devices in the Internet of Things, thereby effectively improving efficiency in a data transmission process, and reducing power consumption of Internet of Things devices.

BRIEF DESCRIPTION OF DRAWINGS

FIG. 7 is a schematic diagram of a definition of a NONACK option field;

FIG. 8 is a schematic diagram of information carried in an option field;

DESCRIPTION OF EMBODIMENTS

The following further describes embodiments of this application in detail with reference to the accompanying drawings.

Figure 1:
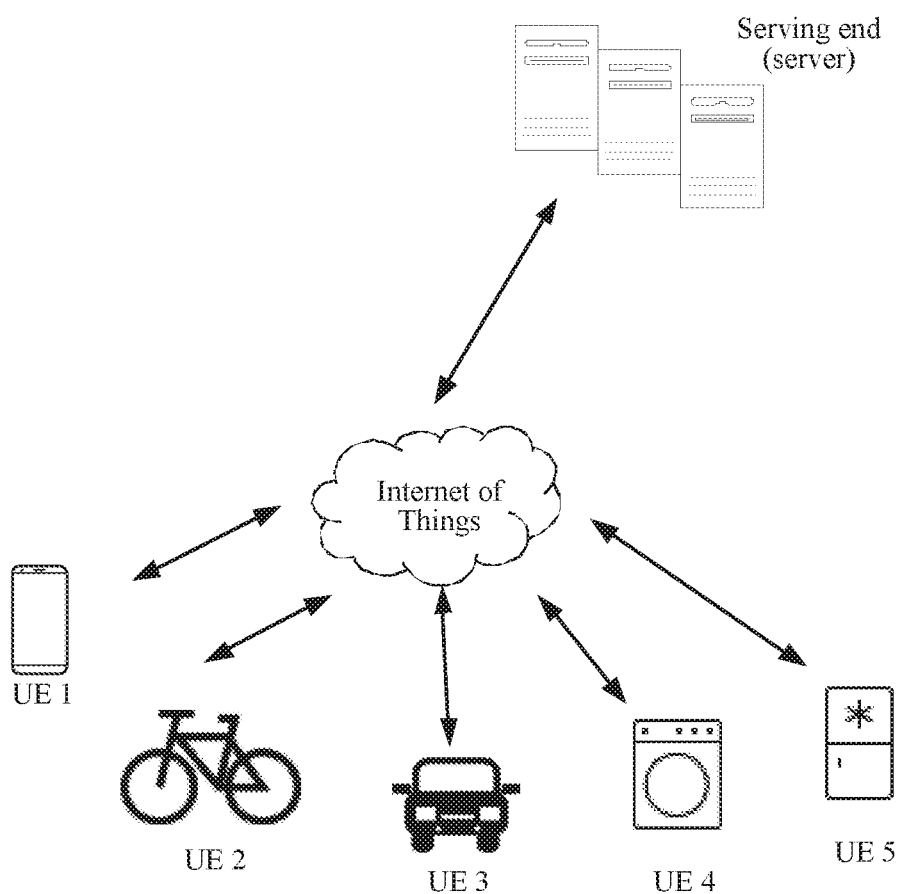
FIG. 1 is a schematic diagram of a typical Internet of Things system in application of the Internet of Things.

The embodiments of this application are applied to Internet of Things applications, for example, cellular-based narrowband Internet of Things (NB-IoT) power meters, NB-IoT water meters, shared bikes, and household appliances. A common mode of the Internet of Things applications is that terminal devices (which is also called UE in this application) work separately, and are all managed by a cloud platform. FIG. 1 is a schematic diagram of a common mode of the Internet of Things applications. UE (UE 1, UE 2, or the like) is a terminal device, Which may also be referred to as a client, and is usually an Internet of Things terminal, for example, a communications module of an intelligent power meter, an intelligent water meter, a shared bike, or an intelligent household appliance. A server is a serving end, and is usually a cloud platform. Various Internet of Things terminals access the cloud platform through the Internet of Things.

Figure 2:
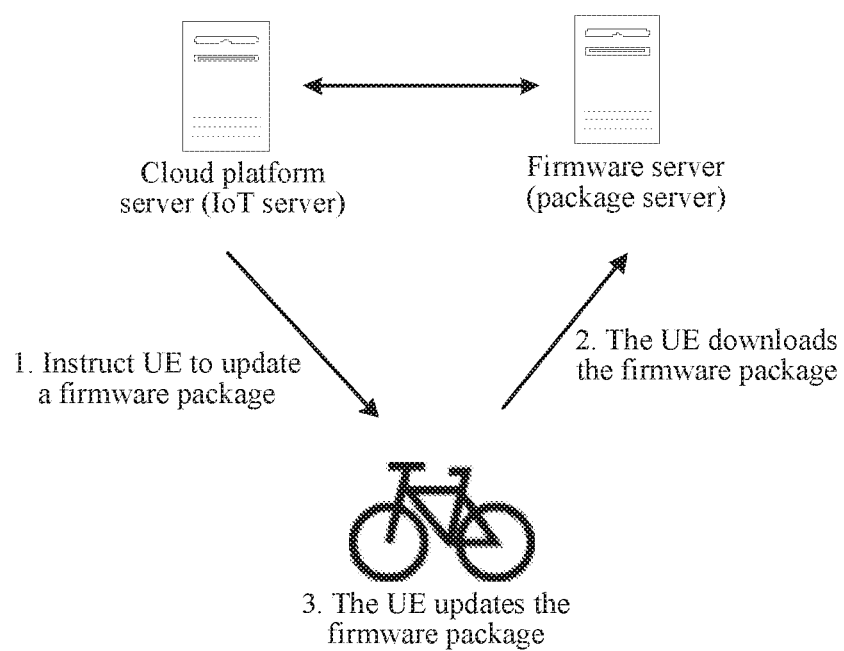
FIG. 2 is a schematic diagram of an application scenario according to an embodiment of this application.

The embodiments of this application may be applied to CoAP-based data block transmission in the Internet of Things. Common scenarios include remote UE firmware package upgrade, UE configuration file update, UE log uploading, and the like. For example, such a typical implementation scenario as the remote UE firmware package upgrade widely exists in current Internet of Things applications. Especially for products facing consumers, for example, shared bikes, a firmware package is remotely upgraded more frequently. In most cases, to take the initiative, manufacturers of such products usually put the products into use rapidly if basic software has no severe problem, and then, constantly optimize the products in use. As shown in FIG. 2, the remote firmware package upgrade usually relates to three modules: a terminal device, a cloud platform server (such as an IoT server), a firmware server. Usually, the cloud platform server manages the UE, and completes resource subscription and message notification. The firmware server is configured to: store a firmware package that needs to be downloaded, and provide the firmware package to UE for downloading. The UE completes downloading and firmware package update. The cloud platform server notifies the terminal device of a new firmware package for update. The terminal device downloads the new firmware package from the firmware server. The cloud platform server instructs the terminal device to perform update after the downloading is completed, In most current Internet of Things (IoT) systems, data is transmitted in a block 2 transmission manner in a CoAP block transmission solution in RFC 7959. In the standard block 2. transmission manner, a serial transmission mode in which a terminal device sends a request and a serving end returns a string of data as a response is used. Each time the terminal device sends a block 2 block request, the serving end adds transmission content of a sub-block to a response message (for example, an acknowledge CoAP), and adds, to the response message, information indicating whether there is content of a next block. In a specific period of time, if no response from the serving end is normally received, a client requests retransmission timeout. The client does not initiate a block request before normally receiving a previous block request. The current CoAP block transmission solution in RFC 7959 can resolve a data block transmission problem in the Internet of Things applications. However, in this solution, each time the UE obtains a data block, the UE needs to send a data block request to the server to perform exchange. Consequently, overheads are large. In addition, because serial exchange is used, at least N times of information exchange are required to transmit N blocks of data. Consequently, a delay is large. Moreover, when an Internet of Things device has a large order of magnitude, the serving end is under great pressure.

The embodiments of this application provide a new CoAP block transmission manner. When a terminal device requests a server for a data block, indication information is carried. The indication information includes a maximum quantity N of consecutive data blocks that can be received in parallel and a time interval T. The server actively pushes one data block to the terminal device at the time interval T until all of the N data blocks are sent. In various embodiments of this application, a data block transmitted between the terminal device and the server is carried in a form of a data packet. The server actively pushes one data block to the terminal device at the time interval T. In other words, the server actively pushes a data packet to the terminal device at the time interval T, where the data packet carries the data block. In the embodiments of this application, exchange of request information during block transmission is reduced. On one hand, overheads of a plurality of requests are reduced, transmission efficiency is improved, and power consumption of Internet of Things UE is reduced. On the other hand, a reduction in requests correspondingly leads to a reduction in pressure on the serving end. In this way, problems of high power consumption and low efficiency of Internet of Things devices are resolved.

To elaborate the technical solutions of this application, a detailed description is given by using embodiments. In the embodiments of this application, a data transmission manner may be obtained through modification of based on original CoAP block 2 data packet transmission in the NB-IoT.

Figure 3:
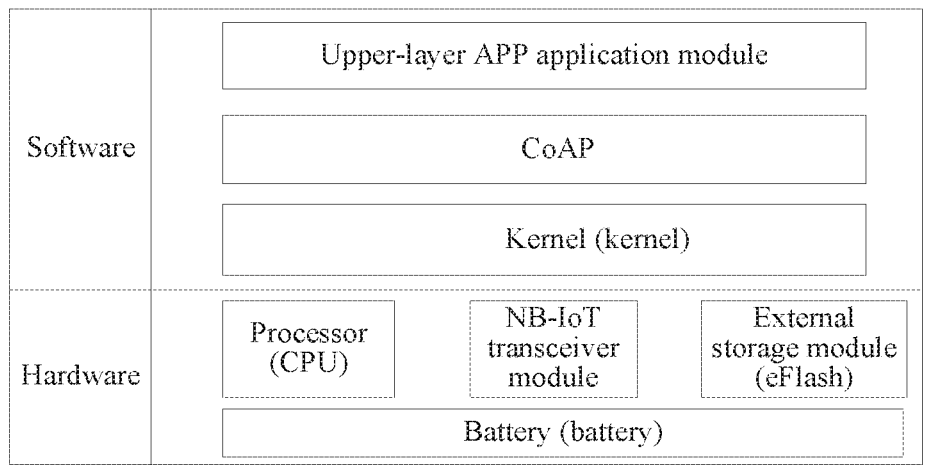
FIG. 3 is a simplified architectural diagram during implementation of this application.

FIG. 3 is a simplified architectural diagram during implementation of this application. Hardware and software are pails used in a terminal device. The hardware usually includes a processor, an NB-IoT transceiver module, an external storage module, a battery, and the like. The external storage module may be a storage medium such as eFlash. The software part includes a kernel, a CoAP layer, and an upper-layer APP application module. The kernel mainly refers to an operating system, a bottom-layer network protocol stack, and the like. The CoAP layer is a CoAP protocol processing layer running in the operating system. The upper-layer APP application module refers to various running application programs. Parts modified in the embodiments of this application are the CoAP layer and the upper-layer APP application module of the software part.

An embodiment of this application provides an Internet of Things system, including the terminal device and the server shown in FIG. 1. The terminal device communicates with the server by using an NB-IoT module.

In the Internet of Things system in this embodiment of this application, the terminal device sends a first data request to the server. The first data request is used to notify the server that the server may continuously send data packets in a non-confirmable manner. The continuously sending data packets in a non-confirmable manner may be understood as that the terminal device does not need to send a data block request to the server to perform exchange each time the terminal device obtains a data block. Instead, the server actively pushes a data packet to the terminal device at a specific time interval, and each time after the server pushes a data packet, the server actively pushes a next data packet after a specific period of time without the need of waiting for a receiving response message sent by the terminal device.

The first data request includes a quantity N of data packets that the terminal device is capable of continuously receiving and a time interval T for sending two consecutive data packets. The server continuously sends N data packets to the terminal device based on the first data request. The N data packets include at least one NON data packet. For example, all the N data packets are NON data packets. For another example, first N−1 data packets in the N data packets are NON data packets. In addition, a sending time interval between two consecutive data packets in the N data packets is the time interval T. It should be noted that, in various embodiments of this application, two consecutive data packets may be understood as two adjacent data packets in the N data packets, for example, an $M^{th}$ data packet and an $(M+1)^{th}$ data packet, where M is greater than or equal to I, and is less than or equal to N−1. In other words, two consecutive data packets may be understood as two data packets having serial numbers.

In various embodiments, the first data request may be indication information carried in a CON data packet (or a CON message) or a NON data packet (or a NON message). The indication information may be a field in a message, and may be sent by using an option field in the CON message or the NON message, for example, may be sent in a CoAP option, a CoAP query option, or a new self-defined NON-ACK option, and the NONACK option is an option newly added based on a CoAP standard protocol.

The NON data packet is a NON-type CoAP that is, a non-confirmable CoAP (NON confirmable CoAP). The terminal device does not need to send a receiving response to the server after receiving the NON data packet, and the server actively continues sending a next data packet to the terminal device after the time interval T until all the N data packets are sent. Therefore, it is not the case that the server only sends a data packet each time the terminal device requests the server for a data packet, thereby reducing exchange of request information during block transmission.

Further, when the server continuously sends the N data packets to the terminal device, the first N−1 data packets are NON data packets, and the last data packet is a CON data packet. The CON data packet is a CON-type CoAP, that is, a confirmable CoAP (confirmable CoAP), used to instruct the terminal device to send a response message to the server. After receiving the CON data packet, the terminal device sends a response message (for example, an ACK message) to the server. The response message is used to notify the server that the terminal device is still in a receiving state.

After continuously sending N−1 NON data packets, the server then sends a CON data packet to the terminal device to detect whether the terminal device has been offline. If the server does not receive the response message of the terminal device, the server confirms that the terminal device has been offline, and stops pushing a data block, to avoid that when a large amount of data is transmitted, server resources are wasted because the terminal device has been offline while the server is still performing sending.

Based on a specific implementation case, the CON data packet may be a data packet that is sent by using a CON type and that carries a data block. In this case, the CON data packet not only is used to send a data block to the terminal device, but also is used to instruct the terminal device to teed back a response message after the terminal device receives the data packet. In another implementation, the CON data packet may alternatively be a data packet that is sent by using a CON type and that does not carry a data block, and is only used to instruct the terminal device to feed back a response message after the terminal device receives the data packet.

In some specific embodiments, the first data request further includes a start number of the N data packets. The start number is used to indicate a start number from which the server sends the N data packets. The server continuously sends, to the terminal device, the N data packets sequentially from a data packet with the start number. The terminal device may receive a data packet that is sent by the server and that corresponds to a data packet number. In this way, a disordering problem of sending data packets can be resolved. In addition, the server can accurately find a to-be-sent data packet when sending data to the terminal device.

An example in which the first data request is sent by using a NONACK option is used. The start number of the data packets may be sent, in the NONACK option, together with the quantity N of the data packets and the time interval T. Alternatively, the quantity N of the data packets and the time interval T may be sent by using the NONACK option, and the start number of the data packets is sent by using another option in a CoAP standard protocol, for example, by using a block option.

Further, the quantity N, carried in the first data request, of the data packets that the terminal device is capable of continuously receiving and the time interval T, carried in the first data request, for sending two consecutive data packets are obtained after the terminal device exchanges information with the server.

Optionally, a method for determining, by the terminal device, the quantity N of the data packets that the terminal device is capable of continuously receiving is: before sending the first data request to the server, sending, by the terminal device, a resource obtaining request to the server, where the resource obtaining request includes an identifier of a data resource requested by the terminal device; after receiving the resource obtaining request sent by the terminal device, sending, by the server to the terminal device, a data amount of the data resource and a data amount that is of a part of the data resource and that is carried in each data packet used to carry the data resource; and determining, by the terminal device based on the data amount of the data resource and the data amount that is of the part of the data resource and that is carried in each data packet used to carry the data resource, the quantity N of the data packets that the terminal device is capable of continuously receiving.

Optionally, a method for determining the time interval T by the terminal device is: determining, by the terminal device, a value T of the time interval in the NONACK option based on time points of data receiving and sending, or a round trip time (RTT) of data between the terminal device and the server, to be specific, determining the time interval T based on a time period from a time point at which the terminal device sends a request to the server to a time point at which the terminal device receives data returned by the server Further, in a process of data exchange between the server and the terminal device, each time the terminal device receives a data packet, the terminal device starts a timer corresponding to a next data packet of the data packet, and sends a retransmission request to the server when the timer expires but the next data packet is not received; and after receiving the retransmission request, the server retransmits the next data packet to the terminal device. A packet loss can be avoided by using a retransmission timeout (RTO) mechanism of a timer, thereby ensuring reliability in a data block transmission process.

In retransmission timeout, a manner of setting an RTO value is not limited. For example, a time period may be preset, or a time period is determined based on an average round trip time of receiving and sending between the terminal device and the server, an arrival rate of a data packet, and a size of a remaining buffer of the terminal device.

Further, in some scenarios, if the terminal device detects that one of data packets is missed or a plurality of data packets are lost, data packet sequence numbers may be sent, so that the server retransmits, one by one, data packets corresponding to the data packet sequence numbers. Therefore, the terminal device may send a second data request to the server, where the first data request includes data packet sequence numbers corresponding to the lost data packets (that is, the data packets that are not received). After receiving the second data request, the server retransmits the data packets corresponding to the data packet sequence number, thereby ensuring reliability in the data block transmission process.

Optionally, the second data request may be indication information carried in a CON data packet (or a CON message) or a NON data packet (or a NON message). The indication information may be a field in a message, and may be sent by using an option field in the CON message or the NON message. For example, the indication information may be sent in a CoAP option, a CoAP query option, or a new self-defined NONACK option, and the NONACK option is an option newly added based on a CoAP standard protocol.

Optionally, the first data request or the second data request may be carried in an option field. An example in which the first data request or the second data request is carried in a NONACK option is used. The NONACK option field includes the quantity N of consecutive data packets that may be allowed to be received by the terminal device, and the time interval T for sending two consecutive data packets, and may further include a data packet sequence number corresponding to a data packet that is not received by the terminal device.

Further, in a data transmission process, a data block may be recorded by using a bitmap, to ensure reliability in the data transmission process. In the bitmap, a value corresponding to an element is marked by using one bit, and data is stored in a form of a bit. After determining a data quantity Ndata quantity N of the data packets, the terminal device generates a bitmap of a corresponding size, and updates a status of the bitmap each time the terminal device receives a data block, thereby recording a status of a received data packet by using the bitmap. For example, if the first data block is received, a bit corresponding to the first data block is updated from 0 to 1.

According to the foregoing embodiment, when the terminal device sends one first data request, the server may continuously send a plurality of data packets through message exchange between the server and the terminal device, thereby reducing request packets in a block transmission process, and improving transmission efficiency in a data transmission process.

Figure 4:
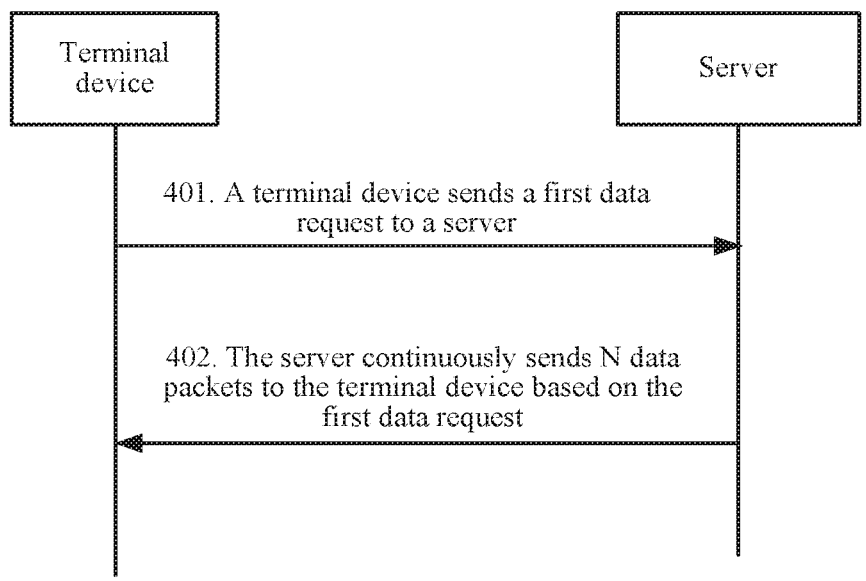
FIG. 4 is a schematic flowchart of a method according to an embodiment of this application.

Referring to FIG. 4, a method procedure in an embodiment of this application includes the following steps:

401. A terminal device sends a first data request to a server.

The first data request is used to instruct the server to continuously send a plurality of data packets to the terminal device. The first data request includes a quantity N of data packets that the terminal device is capable of continuously receiving and a time interval T for sending two consecutive data packets.

In some particular embodiments, for example, when the terminal device already obtains a part of data, or when a data amount is very large, the first data request further includes a start number, and the start number is used to indicate a number from which the server starts to send a data packet.

402. The server continuously sends N data packets to the terminal device based on the first data request, and the terminal device receives the N data packets sent by the server.

A sending time interval between two consecutive NON data packets in the N data packets is the time interval T. The N data packets include at least one NON data packet. For example, all of the N data packets are NON data packets. For another example, first N−1 data packets in the N data packets are NON data packets. The NON data packet indicates that the terminal device does not need to send a receiving response to the server after receiving the NON data packet. The server actively continues sending a next data packet to the terminal device after the time interval T until all of the N data packets are sent.

In an implementation, the server may continuously send a plurality of data packets through the following improvement. The server sends the first data block in a sequence in the first data request, and creates and starts a timer. A timeout period on the timer is the time interval T. The server waits for expiration of the timer, and when the timer expires, sends a next data block; subsequently, determines whether the N data packets that need to be sent in the first data request are all sent; and if not all of the N data packets are sent, starts the timer again, and when the timer expires, continues sending a next data block until all of the N data packets are sent.

Optionally, the server determines whether currently-to-be-sent data is the last data block in the N data packets indicated by the first data request; and if the currently-to-be-sent data is not the last data block in the N data packets, continues sending a data packet in a form of a NON-type CoAP; or if the currently-to-be-sent data is the last data block in the N data packets, sends the last data block in the N data packets in a form of a CON-type CoAP, and waits for a response message (that is, an ACK message) of the terminal device for a sent CoAP, to confirm whether the terminal device is still online and in a receiving state.

After receiving the ACK message sent by the terminal device, if the server confirms that the terminal device is still online, the server continues performing step 402, and continues sending the N data packets. Optionally, each time N data packets are sent, the last data packet in the N data packets is sent in a form of a CON data packet to confirm whether the terminal device is online, until all data resources requested by the terminal device are sent.

The terminal device saves a received data packet, and forms a corresponding complete data file after all required data packets are received.

The following specifically describes processes of data block transmission and exchange between the terminal device and the server. The first data request may be sent in a CoAP option, an existing CoAP query option, or a new self-defined NON ACK option, and the NON ACK option is an option newly added based on a CoAP standard protocol. This embodiment is described by using an example in which the first data request is sent in the NONACK option to negotiate with the server.

Figure 5:
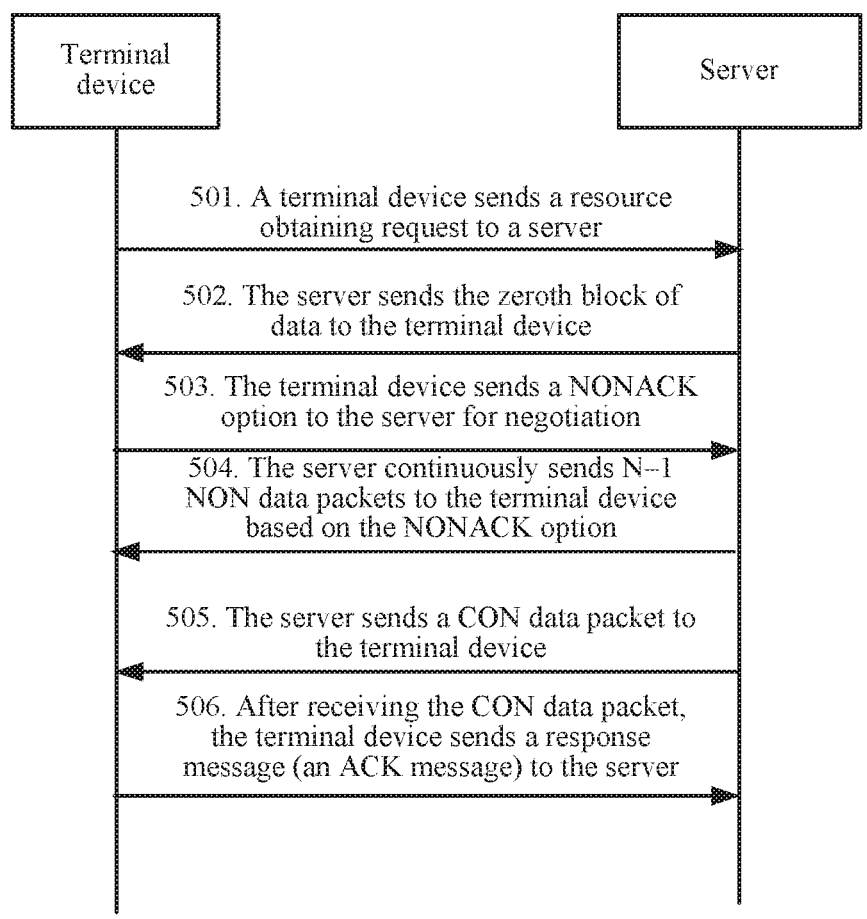
FIG. 5 is a schematic diagram of information exchange between a terminal device and a server according to an embodiment of this application.

As shown in FIG. 5, a method procedure in an embodiment of this application includes the following steps.

501. A terminal device sends a resource obtaining request to a server.

The resource obtaining request is used to request the server for a data resource, and the resource obtaining request includes an identifier of the requested data resource.

In an implementation, the resource obtaining request may be carried in a Get message. The Get message is one of request messages in a CoAP protocol, and is a message type used by the terminal to request the server for a resource. The terminal device sends the Get message to the server. The server responds to the Get message, for example, by using an ACK message.

Figure 6:
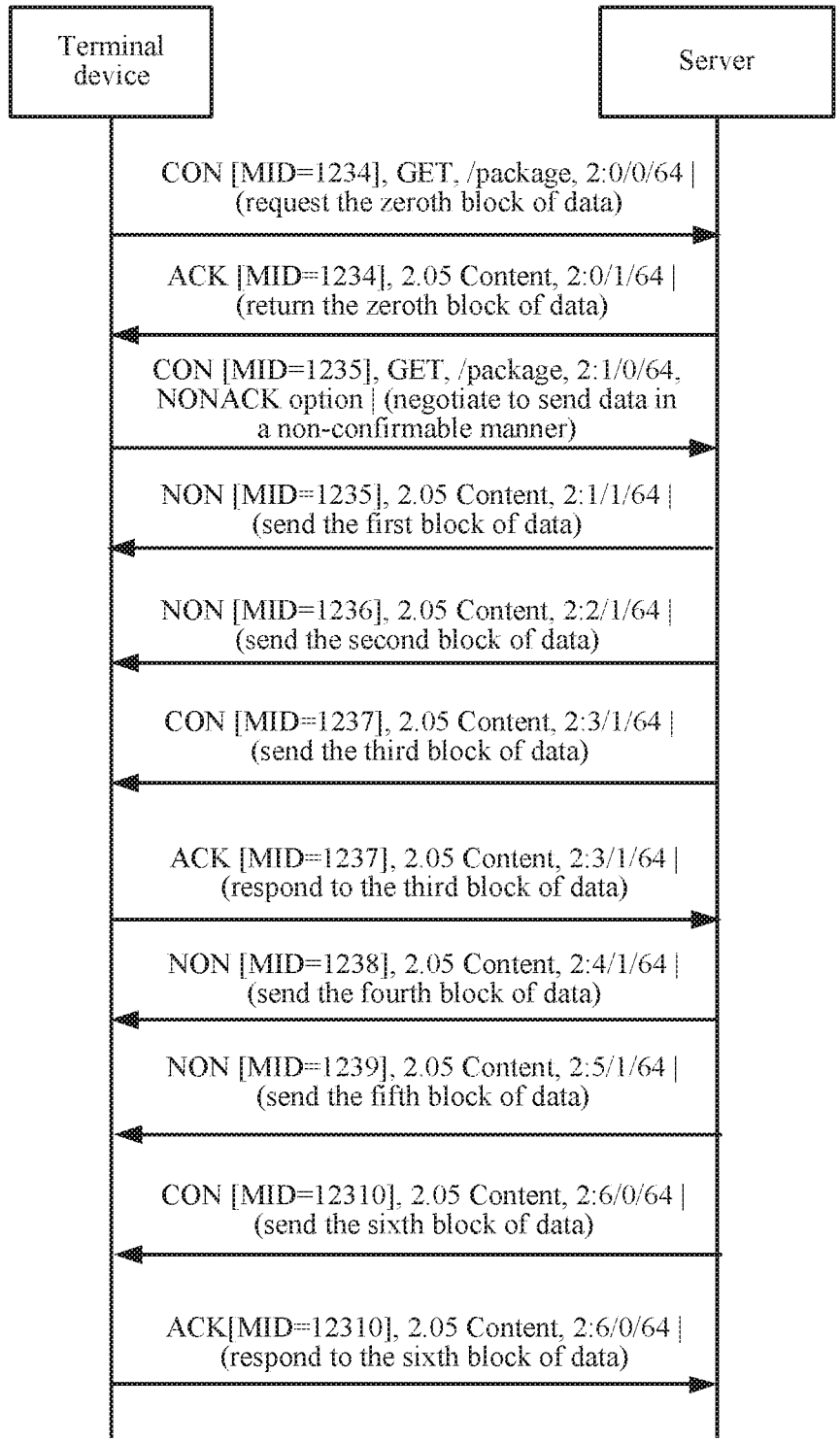
FIG. 6 is a schematic diagram of protocol exchange between a terminal device and a server according to an embodiment of this application.

Data block transmission protocol exchange information may be specifically shown in FIG. 6.

"CON [MID=1234], GET, /package, 2:0/0/64" is a CON data packet sent by the terminal device to the server, and represents that the terminal device requests the server for the zeroth data block by using the Get message, where in 2:0/0/64, 2 means that a block 2 transmission manner is used, the first 0 means that the zeroth data block is requested, the second 0 means whether to continue sending a next data block, and 64 refers to a size of each data packet allowed to be received by the terminal device. Zeroth in the zeroth data block is only an example of a number of a data block. During actual application, a data block may be numbered in another manner.

502. The server sends the zeroth data block to the terminal device.

After receiving the resource obtaining request sent by the terminal device, the server determines a data amount of the data resource that is determined to be sent to the terminal device; determines, based on a size of each data packet allowed to be received by the terminal device, a data amount that is of a part of the data resource and that is carried in each data packet used to carry the data resource; and sends, to the terminal device, the data amount of the data resource and the data amount that is of the part of the data resource and that is carried in each data packet used to carry the data resource.

After receiving a Get request, the server responds by using an ACK message. As shown in FIG. 6, in "ACK [MID=1234], 2.05 Content, 2: 0/1/64", Content represents content returned by the server, and 64 means that the server determines, based on a size of each data packet allowed to be received by the terminal device in the Get request and a processing capability of the server, that a size of each subsequently transmitted data packet is 64, in other words, a size of the data amount that is of the part of the data resource and that is carried in each data packet used to carry the data resource is 64. The ACK message further includes the data amount of the data resource; and if the data resource obtained by the terminal device is a firmware update package, the data amount is a total size of the entire firmware update package.

503. The terminal device sends a NONACK option to the server for negotiation.

After receiving the zeroth data block, on one hand, the terminal device determines a quantity N of the data packets based on a data amount that is of the data resource and that is carried in the zeroth data block and the data amount that is of the part of the data resource and that is carried in each data packet used to carry the data resource. On the other hand, the terminal device calculates a time interval T based on a round trip time from sending the Get message to receiving the ACK message.

Subsequently, the terminal device sends a NONACK option to the server for negotiation, and continuously sends data in a non-confirmable manner, that is, the server continuously sends data blocks to the terminal device at a specific time interval. The server parses the option. If the server agrees, the server performs sending in a negotiated manner. If the server does not agree, an explanation is given in a returned NONACK option, and the server performs sending in a standard manner subsequently.

In this embodiment, an example in Which the NONACK option is an option field in the CON message is used, to describe a definition of a NONACK option field. It may be specified that the option having a number of "XX" shown in FIG. 7 is a NONACK option, and the NONACK option includes the following attributes: a key field (C), unsafe (U), non-cacheable (N), reserved (R), named as NONACK, in a format of binary data (opaque), and having a length of 8 bytes (Length).

A specific format of an option is shown in FIG. 8. Digits 0 to 7 in the first row are used to represent the first to the seventh bits in a byte. Option delta occupies one byte, option delta extended occupies 0 to 2 bytes, information in option delta and option delta extended is a number of the option. If the number corresponds to the number "XX" of the NONACK option defined in FIG. 7, the option is a NONACK option. Option length occupies one byte. Option length extended occupies 0 to 2 bytes. Option value may occupy a plurality of bytes, and is specific information carried in the option. If the option is a NONACK option, information in option value may include the following information or a combination thereof:

(1) a quantity N of data packets (MAX Number of NON-ACKed block, int) at the terminal device is capable of continuously receiving; and (2) a time interval T (Min interval between two sequential blocks, in ms) for sending two consecutive data packets, where if the time interval is 0, it indicates that parallel sending may be performed.

In addition, the NONACK option may further include data packet sequence numbers based on a requirement in specific implementation. The data packet sequence numbers may be discrete or continuous. The data packet sequence number is used to indicate a data packet that is not received by the terminal device, and instruct the server to retransmit a data packet corresponding to the data packet sequence number.

Optionally, based on an actual requirement, the NON-ACK option may further include a start number from which the server sends N data packets.

The server determines, based on a processing capability of the server, whether the server can continuously send the N data packets based on the quantity N of the data packets that the terminal device is capable of continuously receiving. If the server can continuously send the N data packets, the server determines the quantity N of the data packets as a quantity N of the data packets continuously sent to the terminal device. If the server cannot continuously send the N data packets, the server determines, based on the quantity N, a proper value as a quantity N of continuously sent data packets.

Similarly, the server may directly determine the time interval T as a time interval T for sending two consecutive data packets. In another implementation, the server may determine a sending time interval T based on a sending capability of the server, provided that the sending time interval T is within a bearing capability range of the terminal device, and then, send a data packet at the determined time interval T. Physically, the sending time interval is a receiving time interval of the terminal device, As shown in FIG. 6, "CON [MID=1235], GET, /package; 2:1/0/64, option NONACK" represents the terminal device sends a NONACK option message to negotiate with the server to continuously send data packets in a non-confirmable manner. To be specific, the N data packets are continuously sent to the terminal device when the terminal device does not request the data packets one by one. A sending time interval between two consecutive data packets is the time interval T, where N and T are carried in the NONACK option.

504. The server continuously sends N−1 NON data packets to the terminal device based on the NONACK option, and the terminal device receives the N−1 NON data packets sent by the server.

First N−1 data packets in the N data packets are NON data packets.

As shown in FIG. 6, a value of N is 3. "NON [MID-1235], 2.05 Content, 2:1/1/64" represents the first data block sent by the server to the terminal device, where 64 means that a size of the data block is 64. "NON [MID=1236], 2.05 Content, 2:2/1/64" represents the second data block sent by the server to the terminal device, where 64 means that a size of the data block is 64. Therefore, the server sends two consecutive NON data packets to the terminal device each time.

505. The server sends one CON data packet to the terminal device.

To detect whether the terminal device is still online and in a receiving state, after sending the N−1 NON data packets, the server sends one CON data packet to the terminal device, so that the terminal device returns a response message to the server. In other words, an $N^{th}$ data packet is a CON data packet. As shown in FIG. 6, "CON [MID=1237], 2.05 Content, 2:3/1/64" represents the third data block sent by the server to the terminal device, where 64 means that a size of the data block is 64. The data block is sent by using a CON-type CoAP.

506. After receiving the CON data packet, the terminal device sends a response message (an ACK) to the server.

As shown in FIG. 6, "ACK [MID=1237], 2.05 Content, 2:3/0/64" is the response message returned by the terminal device to the server after the terminal device receives the CON data packet, to notify the server that the terminal device is in an online state and may continue sending a data packet.

Subsequently, the server continues performing step 504 and step 505 until content of an entire data resource, for example, a firmware update package, requested by the terminal device is sent to the terminal device.

As shown in FIG. 6, "NON [MID=1238], 2.05 Content, 2:4/1/64; NON [MID=1239], 2.05 Content, 2:5/0/64; CON [MID=12310], 2.05 Content, 2:5/0/64; ACK [MID=12310], 2.05 Content, 2:5/0/64" respectively represent that data is sent in a manner in which two data packets are sent by using a NON message, and then, one data packet is sent by using a CON message.

Figure 9:
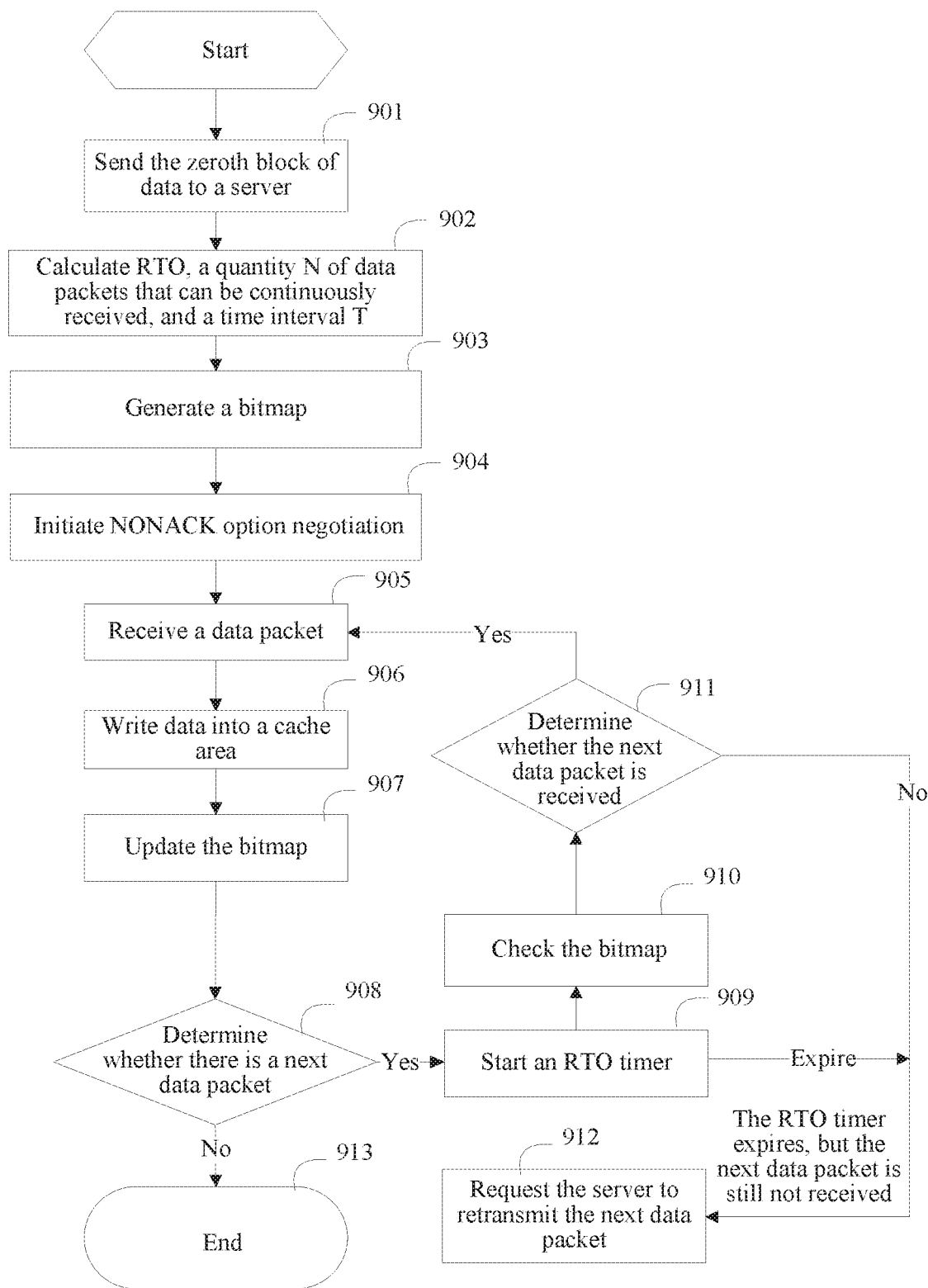
FIG. 9 is a schematic flowchart of another method according to an embodiment of this application.

Further, a retransmission mechanism may be combined based on the embodiment shown in FIG. 5, and recording is performed by using a bitmap to ensure reliability in a data transmission process. The following describes a procedure of data transmission between a terminal device and a server with reference to a flowchart of a method in FIG. 9.

901. The terminal device obtains the zeroth data block from the server.

Zeroth in the zeroth data block is only an example of a number of a data block. During actual application, a data block may alternatively be numbered in another manner.

The terminal device sends a resource obtaining request (for example, a Get request) to the server, to obtain the zeroth data block, and the resource obtaining request carries a size of each data packet allowed to be received by the terminal device. The server sends the zeroth data block to the terminal device, and the zeroth data block includes a data amount of a data resource and a data amount that is of a part of the data resource and that is carried in each data packet used to carry the data resource.

902. Calculate a retransmission timeout (RTO) value, a quantity N of data packets that can be continuously received, and a time interval T.

After receiving the zeroth data block, the terminal device determines, based on the data amount of the data resource and the data amount that is of the part of the data resource and that is carried in each data packet used to carry the data resource, a maximum quantity N of the data packets that the terminal device is capable of continuously receiving.

In addition, the terminal device further determines a value T of the time interval in a NONACK option based on time points of receiving and sending or a round trip time (RTT) between the terminal device and the server.

In addition, the terminal device calculates the retransmission timeout (RTO) value based on an average RTT, a data packet arrival rate, and a size of a remaining butler of the terminal device. Specifically, to calculate the RTO, a network status and a status of a random access memory (RAM) of the terminal device need to be considered. If there are out-of-order packets in an applied buffer, that is, there is a missed packet, the packets cannot be written into a read-only memory (ROM) in patch. If a waiting time is excessively long, RAM overheads are affected. Therefore, retransmission needs to be requested in time. If the RTO value is excessively short, an opportunity of successfully receiving a packet is lost. In an embodiment, the terminal device may set the RTO by using the following formula:

$$RTO < \min\left(\frac{\text{remaining buffer size (byte)}}{\text{date packet arrival rate (bps)}}, 2 * \text{average } RTT\right)$$

903. Generate a bitmap.

The terminal device may record a data block by using a bitmap. A total quantity of blocks is obtained based on the data amount of the data resource in the zeroth data block and the data amount that is of the part of the data resource and that is carried in each data packet used to carry the data resource, and a bitmap having a corresponding size is generated. Subsequently, a status of the bitmap is updated each time a data block is received, so that a status of a received data packet is recorded by using the bitmap.

Optionally, the terminal device may maintain a table, to record whether each block is received. In addition, whether received data blocks are out of order may be determined based on the total quantity of blocks.

904. Initiate NONACK option negotiation to the server.

The NONACK option carries the maximum quantity N of data packets that the terminal device is capable of continuously receiving and the time interval T. The terminal device sends a NONACK option to negotiate with the server to continuously send data packets in a non-confirmable manner. That is, the server continuously sends data packets to the terminal device at a specific time interval, The server parses the option. If the server agrees, the server performs sending in a negotiated mariner. If the server does not agree, an explanation is given in a returned NONACK option, and the server performs sending in a standard manner subsequently.

Optionally, the server sends a data packet to the terminal device based on the maximum quantity N, carried in the NONACK option, of the data packets that the terminal device is capable of continuously receiving and the time interval T.

Optionally, the server may determine, based on a processing capability of the server and with reference to the maximum quantity N, carried in the NONACK option, of the data packets that the terminal device is capable of continuously receiving and the time interval T, a proper quantity N of continuously sent data packets and a proper time interval T.

For example, when the maximum quantity N, carried in the NONACK option, of the data packets that the terminal device is capable of continuously receiving is 100, the server determines, based on the processing capability of the server, that the proper quantity N of continuously sent data packets is 50, and subsequently sends NON data packets based on that the quantity N of continuously sent data packets is 50.

905. Receive a data packet sent by the server.

The server continuously sends NON data packets to the terminal device. A time interval between each pair of continuously sent NON data packets is the proper time interval T determined by the server in step 904.

When no request needs to be sent to the server, after a NON data packet is received, there is no need to request the server for a next data packet, and the server automatically sends the next data packet.

906. Write data into a cache area.

Each time the terminal device receives a data packet, the terminal device writes, into the cache area, a data block carried in the data packet.

907. Update the bitmap.

Each time the terminal device receives a data packet, the terminal device updates the status of the bitmap generated in step 903, to record a receiving status of each data packet.

908. Determine Whether there is a next data packet.

Each time the terminal device receives a data packet, the terminal device determines, based on the bitmap, whether there is a next data packet. If there is a next data packet, step 909 is performed. If there is no next data packet, step 913 is performed.

909. If there is a next data packet, start an RTO timer.

Each time the terminal device receives a data packet, the terminal device starts the RTO timer, and waits for a next data packet; and if the RTO timer expires but the next data packet is still not received, performs step 912; or if the next data packet is received before the RTO timer expires, cancels the current RTO

910. Check the bitmap.

Each time the terminal device receives a data packet, the terminal device starts the RTO timer, waits for a next data packet, and checks the bitmap, to check whether the next data packet is received.

911. Determine whether the next data packet has been received.

912. If the RTO timer expires but the next data packet is still not received, request the server to retransmit a next data block.

For example, after receiving a block 1, the terminal device starts an RTO timer for the second block, and then, receives the third block and the fourth block. Until the RTO timer for the second block expires, the terminal device performs step 912 to initiate a separate retransmission request of the second data block.

913. End the procedure.

If all data in the bitmap is received, the procedure ends.

Further, out-of-order blocks may appear in a data sending process. Out-of-order blocks may appear due to a loss of a data packet, or because data packets received by the UE are out of order. When out-of-order blocks appear, a data packet sequence number of a data packet that needs to be retransmitted may be carried in a NONACK option, to instruct the server to retransmit the data packet corresponding to the data packet sequence number.

This embodiment of the present invention may be improved based on a standard CoAP block transmission technology. A modified logical unit mainly includes a CoAP module, an application processed part, and a processing of server. A newly added NONACK option is used by two parties to complete negotiation about a new transmission manner. Then, the terminal device resolves an out-of-order problem and a packet loss problem by using an RTO timer Compared with the standard CoAP block transmission technology, request packets in a block transmission process are reduced, thereby reducing power consumption and improving efficiency.

This embodiment can improve efficiency in a data transmission scenario and reduce power consumption in a data transmission process. To improve the efficiency, request packets that are sent are reduced. The server actively pushes a data block at a time interval, thereby improving efficiency of data transmission between the terminal device and the server. For example, originally, one RTT time is required for obtaining one data block. However, through a new mechanism, an average delay of obtaining one data block is approximately ½ RTT, and efficiency is correspondingly improved by 50%. To reduce the power consumption, using an NB-IoT network as an example, usually, power consumption in data transmission is 4 times that in data reception, and is 30 times that in a case of an idle state of the terminal device.

The foregoing describes the method embodiments in the embodiments of this application.

The following describes a terminal device and a server in the embodiments of this application from perspectives of functional modules and hardware implementation.

Figure 10:
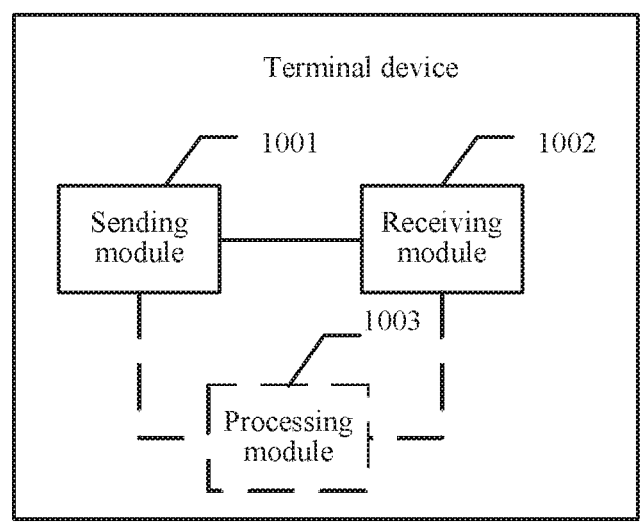
FIG. 10 is a structural diagram of functional modules of a terminal device according to an embodiment of this application.

As shown in FIG. 10, a terminal device includes at least the following functional modules:

a sending module 1001, configured to send a first data request to a server, where the first data request is used to instruct the server to continuously send a plurality of data packets, the first data request includes a quantity N of data packets that the terminal device is capable of continuously receiving and a time interval for sending two consecutive data packets, and N is greater than 1; and a receiving module 1002, configured to receive N data packets continuously sent by the server, where the N data packets include at least one NON data packet, a sending time interval between two consecutive data packets in the N data packets is the time interval, and the NON data packet is a data packet indicating that the terminal device does not need to send a receiving response to the server.

In some specific embodiments, the last data packet in the N data packets received by the receiving module 1002 is a CON data packet. The sending module 1001 is further configured to send a response message to the server after the receiving module 1002 receives the CON data packet, where the response message is used to notify the server that the terminal device is in a receiving state.

In some specific embodiments, the first data request sent by the sending module 1001 further includes a start number of the N data packets, and the N data packets are data packets having increasing numbers from the start number.

In some specific embodiments, the sending module 1001 is further configured to: before sending the first data request to the server, send a resource obtaining request to the server, where the resource obtaining request includes an identifier of a requested data resource. The receiving module 1002 is further configured to receive a data amount of the data resource sent by the server and a data amount that is of a part of the data resource and that is carried in each data packet used to carry the data resource. The terminal device further includes a processing module 1003, configured to determine the quantity N of the data packets based on the data amount of the data resource and the data amount that is of the part of the data resource and that is carried in each data packet used to carry the data resource.

In some specific embodiments, the processing module 1003 is further configured to start, after the receiving module 1002 receives a data packet, a timer corresponding to a next data packet of the data packet. The sending module 1001 is further configured to send a retransmission request to the server when the timer expires but the next data packet is not received, where the retransmission request is used to instruct the server to retransmit the next data packet.

In some specific embodiments, the sending module 1001 is further configured to send a second data request to the server, where the second data request includes a data packet sequence number, and the data packet sequence number is used to indicate a data packet that is not received by the terminal device. The receiving module 1002 is further configured to receive a data packet that is retransmitted by the server based on the second data request and that corresponds to the data packet sequence number.

In some specific embodiments, the first data request or the second data request sent by the sending module 1001 is sent in a CoAP option, a CoAP query option, or a NONACK option.

Figure 11:
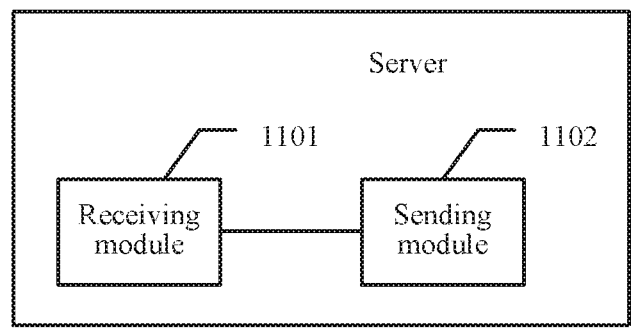
FIG. 11 is a structural diagram of functional modules of a server according to an embodiment of this application.

As shown in FIG. 11, a server includes at least the following functional modules:

a receiving module 1101, configured to receive a first data request sent by a terminal device, where the first data request includes a quantity N of data packets that the terminal device is capable of continuously receiving and a time interval for sending two consecutive data packets, and N is greater than 1; and a sending module 1102, configured to continuously send N data packets to the terminal device based on the first data request, where the N data packets include at least one NON data packet, a sending time interval between two consecutive data packets in the N NON data packets is the time interval, and the NON data packet is a data packet indicating that the terminal device does not need to send a receiving response to the server In some specific embodiments, the last data packet in the N data packets sent by the sending module 1102 is a CON data packet, and the CON data packet is used to instruct the terminal device to send a response message to the server.

In some specific embodiments, the first data request received by the receiving module 1101 further includes a start number of the N data packets, The sending module 1102 is specifically configured to continuously send, to the terminal device, the N data packets sequentially from a data packet with the start number.

In some specific embodiments, the receiving module 1101 is further configured to: before receiving the first data request sent by the terminal device, receive a resource obtaining request sent by the terminal device, where the resource obtaining request includes an identifier of a requested data resource. The sending module 1102 is further configured to send, to the terminal device based on the identifier of the data resource, a data amount of the data resource and a data amount that is of a part of the data resource and that is carried in each data packet used to carry the data resource, where the data amount of the data resource and the data amount that is of the part of the data resource and that is carried in each data packet used to carry the data resource are used by the terminal device to determine the quantity N of the data packets.

In some specific embodiments, the receiving module 1101 is further configured to receive a second data request sent by the terminal device, where the second data request includes a data packet sequence number, and the data packet sequence number is used to indicate a data packet that is not received by the terminal device. The sending module 1102 is further configured to send a data packet corresponding to the data packet sequence number to the terminal device.

In some specific embodiments, the first data request or the second data request received by the receiving module 1101 is sent in a CoAP option, a CoAP query option, or a NONACK option.

For information exchange between modules of the terminal device shown in FIG. 10 and modules of the server shown in FIG. 11, refer to the foregoing method embodiments (the embodiments shown in FIG. 1 to FIG. 9), and details are not described in this embodiment of this application again.

During actual application, functions implemented by the functional modules in the terminal device shown in FIG. 10 or functions implemented by the functional modules in the server shown in FIG. 11 may be implemented by using an application-specific integrated circuit (ASIC) or a programmable logic device PLD). The PLD may be a complex programmable logic device (CPLD), a field-programmable gate array (FPGA), generic array logic (generic array logic, GAL), or any combination thereof.

Figure 12:
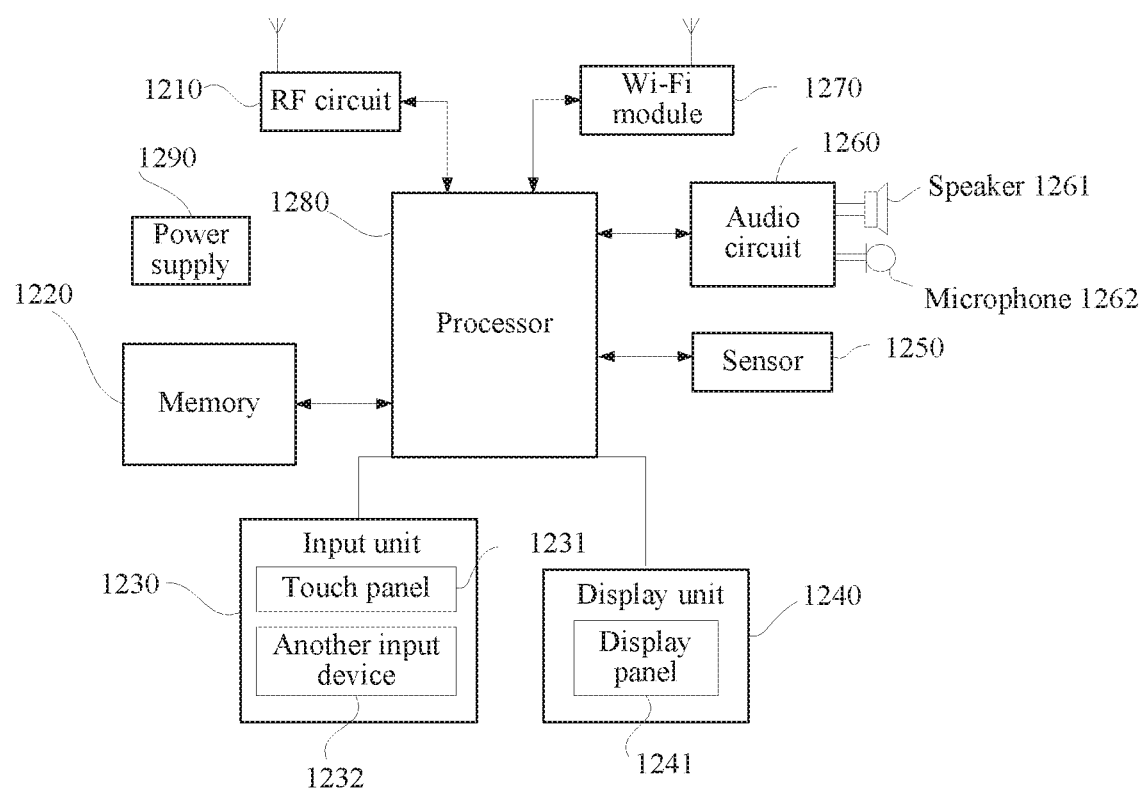
FIG. 12 is a schematic diagram of a hardware structure of a terminal device according to an embodiment of this application.

During actual application, the terminal device may be various Internet of Things terminals shown in FIG. 1, A hardware structure of the terminal device is described in detail below with reference to FIG. 12. FIG. 12 is a block diagram of a part of the hardware structure of the terminal device. The terminal device includes components such as a radio frequency (Radio Frequency, RF) circuit 1210, a memory 1220, an input unit 1230, a display unit 1240, a sensor 1250, an audio circuit 1260, a wireless fidelity (Wi-Fi) module 1270, a central processing unit 1280, a power supply 1290, and a USB interface 1211. A person skilled in the art may understand that the structure of the terminal device shown in FIG. 12 does not constitute a limitation to the terminal device, and the terminal device may include more or fewer components than those shown in the figure, or some components may be combined, or a different component deployment may be used.

The following specifically describes the components of the terminal device with reference to FIG. 12.

The RF circuit 1210 may be configured to receive and send information and receive and send signals in a call process. Particularly, the RF circuit receives downlink information from a base station, then delivers the downlink information to the central processing unit 1280 for processing, and sends related uplink data to the base station. Usually, the RF circuit 1210 includes, but is not limited to, an antenna, at least one amplifier, a transceiver, a coupler, a Low Noise Amplifier (LNA), a duplexer, and the like. In addition, the RF circuit 1210 may further communicate with a network and another device through wireless communication.

The memory 1220 may be configured to store a software program and module. The central processing unit 1280 runs the software program and module stored in the memory 1220, to implement various functional applications of the terminal device and process data. The memory 1220 may mainly include a program storage area and a data storage area. The program storage area may store an operating system, an application program required by at least one function (such as a sound playback function and an image display function). The data storage area may store data (such as audio frequency data and an address book) created according to the use of the terminal device, and the like. In addition, the memory 1220 may include a high-speed random access memory, and may further include a nonvolatile memory such as at least one magnetic disk storage device, a flash memory, or another volatile solid-state storage device.

The input unit 1230 may be configured to: receive input digit or character information, and generate a key signal input related to a user setting and function control of the terminal device. Specifically, the input unit 1230 may include a touch panel 1231 and another input device 1232. The touch panel 1231, also referred to as a touchscreen, may collect a touch operation of a user on or near the touch panel 1231 (such as an operation of the user on the touch panel 1231 or near the touch panel 1231 by using any suitable object or accessory such as a finger or a stylus), and drive a corresponding connection apparatus based on a preset program, Optionally, the touch panel 1231 may include two parts: a touch detection apparatus and a touch controller. The touch detection apparatus detects a touch direction of the user, detects a signal generated from the touch operation, and transfers the signal to the touch controller. The touch controller receives touch information from the touch detection apparatus, converts the touch information into touch point coordinates, and then sends the touch point coordinates to the processor 1280. Moreover, the touch controller can receive and execute a command sent by the processor 1280. In addition, the touch panel 1231 may be implemented into a plurality of types such as a resistive, capacitive, infrared, or surface acoustic wave type touch panel. In addition to the touch panel 1231, the input unit 1230 may further include the another input device 1232. Specifically, the another input device 1232 may include, but is not limited to, one or more of a physical keyboard, a functional key (such as a volume control key or a switch key), a trackball, a mouse, and a joystick.

The display unit 1240 may be configured to display information entered by a user or information provided to a user. The display unit 1240 may include a display panel 1241. Optionally, the display panel 1241 may be configured by using a liquid crystal display (LCD), an organic light-emitting diode (OLEO), or the like. Further, the touch panel 1231 may cover the display panel 1241. After detecting a touch operation on or near the touch panel 1231, the touch panel 1231 transfers the touch operation to the processor 1280, to determine a type of a touch event. Then, the central processing unit 1280 provides a corresponding visual output on the display panel 1241 according to the type of the touch event. Although in FIG. 12, the touch panel 1231 and the display panel 1241 are used as two separate parts to implement input and output functions of the terminal device, in some embodiments, the touch panel 1231 and the display panel 1241 may be integrated to implement the input and output functions of the terminal device.

The terminal device may further include at least one sensor 1250 such as an optical sensor, a motion sensor, and another sensor. Specifically, the optical sensor may include an ambient light sensor and a proximity sensor. The ambient light sensor may adjust luminance of the display panel 1241 according to brightness of ambient light. The proximity sensor may switch off the display panel 1241 and/or backlight when the terminal device is moved to the ear. As one type of motion sensor, an acceleration sensor may detect magnitude of accelerations in various directions (generally, tri-axial), can detect magnitude and a direction of the gravity when the terminal device is static, and may be applied to an application that recognizes a gesture of the terminal device (for example, switching between landscape orientation and portrait orientation, a related game, and magnetometer gesture calibration), and functions related to vibration recognition (such as a pedometer and tapping), and the like. As for other sensors such as a gyroscope, a barometer, a hygrometer, a thermometer, and an infrared sensor that may be further configured for the terminal device, details are not described herein.

The audio circuit 1260, a speaker 1261, and a microphone 1262 may provide audio interfaces between the user and the terminal device. The audio circuit 1260 may convert received audio data into an electric signal and transmit the electric signal to the speaker 1261. The speaker 1261 converts the electric signal into a sound signal for output. In addition, the microphone 1262 converts a collected sound signal into an electric signal. The audio circuit 1260 receives the electric signal and converts the electric signal into audio data, and outputs the audio data to the central processing unit 1280 for processing. Then, the central processing unit 1280 sends the audio data to, for example, another terminal device by using the RF circuit 1210, or outputs the audio data to the memory 1220 for further processing.

Wi-Fi is a short-distance wireless transmission technology, and provides wireless broadband Internet access to the terminal device. Although FIG. 12 shows the Wi-Fi module 1270, it may be understood that the Wi-Fi module 1270 is not an essential component of the terminal device, and the Wi-Fi module 1270 may be omitted as required, provided that the scope of the essence of the present invention is not changed.

The central processing unit 1280 is the control center of the terminal device, and connects various parts of the terminal device by using various interfaces and lines. By running or executing the software program and/or module stored in the memory 1220, and invoking data stored in the memory 1220, the central processing unit 1280 performs various functions of the terminal device and processes data, thereby performing overall monitoring on the terminal device. Optionally, the central processing unit 1280 may include one or more processing units. Preferably, the central processing unit 1280 may integrate an application processor and a modem processor. The application processor mainly processes an operating system, a user interface, an application program, and the like. The modem processor mainly processes wireless communication. It may be understood that the modem processor may alternatively not be integrated into the central processing unit 1280. In this embodiment of this application, the central processing unit 1280 is configured to perform all or some steps in the methods performed by the terminal device in FIG. 1 to FIG. 7.

The terminal device further includes the power supply 1290 (such as a battery) for supplying power to various components. Preferably, the power supply may be logically connected to the central processing unit 1280 by using a power management system, thereby implementing functions such as charging, discharging, and power consumption management by using the power management system.

Although not shown in the figure, the terminal device may further include a camera, a Bluetooth module, and the like, and details are not described herein.

During actual application, the server in the embodiments of this application may be a server or a server cluster on an Internet of Things cloud platform shown in FIG. 1. The following describes a hardware structure of the server in detail with reference to FIG. 13.

Figure 13:
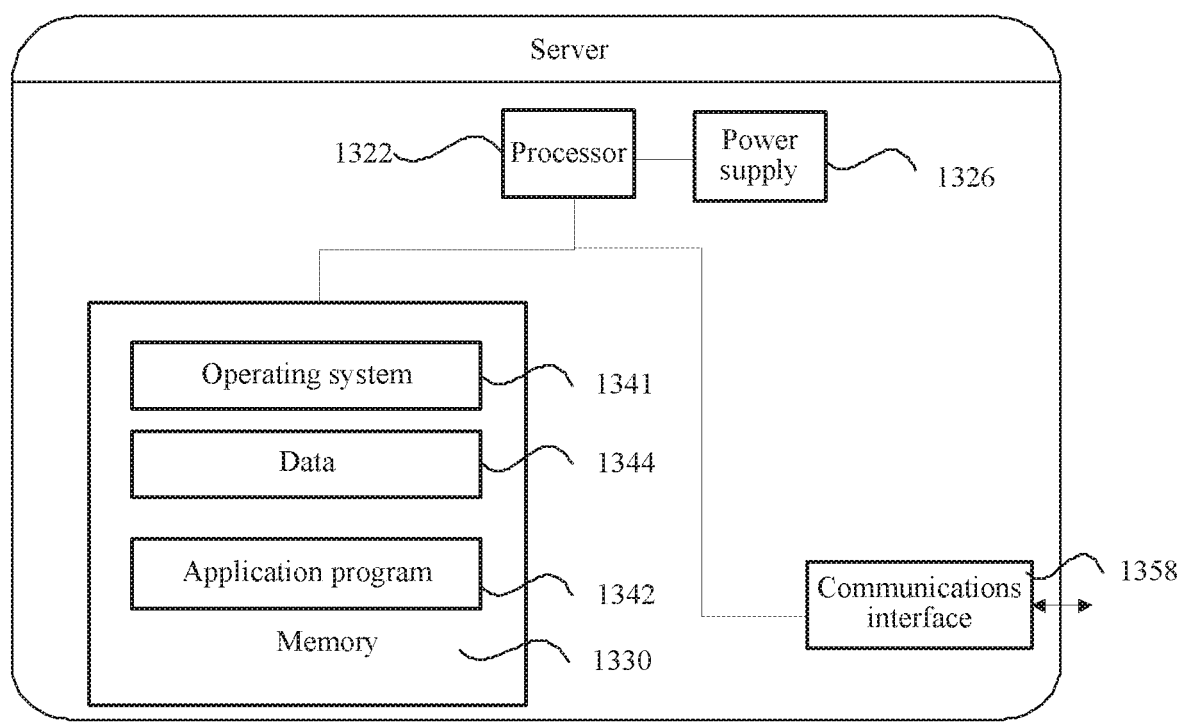
FIG. 13 is a schematic diagram of a hardware structure of a server according to an embodiment of this application.

FIG. 13 is a schematic diagram a hardware structure of a server according to an embodiment of this application. The server may vary greatly due to different configurations or different performance, and may include one or more processors (CPUs) 1322 and a memory 1330. The memory 1330 stores one or more application programs 1342, data 1344, and one or more operating systems 1341. The program stored in the memory 1330 may include one or more modules, and each module may include a series of instruction operations.

Specifically, a processor 1320 runs the instructions stored in the memory 1330, to implement all or some steps in the foregoing method embodiments (the embodiments shown in FIG. 1 to FIG. 9).

The processor 1322 may include one or more power supplies 1326 and one or more communications interfaces 1358. The communications interface 1358 may include an input/output interface or a wired or wireless network interface.

It should be noted that all or some of the foregoing embodiments may be implemented by using software, hardware, firmware, or any combination thereof. When software is used to implement the embodiments, the embodiments may be implemented all or partially in a form of a computer program product.

The computer program product includes one or more computer instructions. When the computer program instructions are loaded and executed on a computer, the procedures or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example. a floppy disk, a hard disk, or a magnetic tape), an optical medium (for example, a DVD), a semiconductor medium (for example, a solid-state drive (Solid State Disk, SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

It should be understood that terms used in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

In the several embodiments provided in this application, it should be understood that the disclosed system, apparatus, and method may be implemented in other manners. For example, the described apparatus embodiment is merely an example. For example, the unit division is merely logical function division and there may be other division in actual implementation, For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (ROM), a random access memory RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An Internet of Things data transmission method, comprising:
   sending, by a terminal device, a first data request to a server, wherein the first data request instructs the server to continuously send a plurality of data packets, the first data request comprises a quantity N of data packets, that the terminal device is capable of continuously receiving, and a time interval for sending two consecutive data packets, where N is an integer greater than 1; and
   continuously receiving, by the terminal device, N data packets from the server, wherein the N data packets comprise at least one non-confirmable Constrained Application Protocol (NON) data packet, a sending time interval between two consecutive data packets in the N data packets, and the at least one NON data packet indicates that sending a receiving response from the terminal device to the server is unnecessary.

2. The method according to claim 1, wherein a last data packet in the N data packets is a confirmable Constrained Application Protocol (CON) data packet; and
   the method further comprises:
   sending, by the terminal device, a response message to the server after receiving the CON data packet, wherein the response message notifies the server that the terminal device is in a receiving state.

3. The method according to claim 1, wherein the first data request further comprises a start number of the N data packets, and the N data packets are data packets having corresponding incremented numbers from the start number.

4. The method according to claim 1, wherein before the sending, by the terminal device, the first data request to the server, the method further comprises:
   sending, by the terminal device, a resource obtaining request to the server, wherein the resource obtaining request comprises an identifier of a requested data resource;
   receiving, by the terminal device, a first data amount of the requested data resource from the server and a second data amount that is a part of the requested data resource and is included in each data packet, and each data packet includes the requested data resource; and
   determining, by the terminal device, the quantity N of the data packets based on the first data amount of the requested data resource and the second data amount that is the part of the requested data resource.

5. The method according to claim 1, further comprising:
   starting, by the terminal device, after receiving a data packet of the N data packets, a timer corresponding to a next data packet of the N data packets, and
   sending a retransmission request to the server in response to the timer expiring and the next data packet of the N data packets failing to be received, wherein the retransmission request instructs the server to retransmit the next data packet of the N data packets.

6. The method according to claim 1, further comprising:
   sending, by the terminal device, a second data request to the server, wherein the second data request comprises a data packet sequence number, and the data packet sequence number indicates a data packet of the N data packets that failed to be received by the terminal device; and
   receiving, by the terminal device, a data packet that is retransmitted by the server based on the second data request and that corresponds to the data packet sequence number.

7. The method according to claim 1, wherein the first data request is sent in a Constrained Application Protocol option (CoAP) option field , a Constrained Application Protocol query option (CoAP) query option field, or a non-acknowledged option NONACK option field.

8. An Internet of Things data transmission method, comprising:
   receiving, by a server, a first data request from a terminal device, wherein the first data request comprises a quantity N of data packets, that the terminal device is capable of continuously receiving, and a time interval for sending two consecutive data packets, where N is an integer greater than 1; and
   continuously sending, by the server, N data packets to the terminal device based on the first data request, wherein the N data packets comprise at least one non-confirmable Constrained Application Protocol (NON) data packet, a sending time interval between two consecutive data packets in the N data packets, and the at least one NON data packet indicates that sending a receiving response from the terminal device to the server is unnecessary.

9. The method according to claim 8, wherein a last data packet in the N data packets is a confirmable Constrained Application Protocol (CON) data packet; and
   the CON data packet instructs the terminal device to send a response message to the server.

10. The method according to claim 8, wherein
    the first data request further comprises a start number of the N data packets; and
    the server continuously sends, to the terminal device, the N data packets having corresponding incremented numbers from a data packet of the N data packets having the start number.

11. The method according to claim 8, wherein before receiving the first data request from the terminal device, the method further comprises:

receiving, by the server, a resource obtaining request by from the terminal device, wherein the resource obtaining request comprises an identifier of a requested data resource; and sending, by the server to the terminal device based on the identifier of the requested data resource, a first data amount of the requested data resource and a second data amount that is a part of the requested data resource and is included in each data packet, and each data packet includes the requested data resource, wherein the first data amount of the requested data resource and the second data amount that is the part of the requested data resource, and are useable by the terminal device to determine the quantity N of the data packets.

12. The method according to claim 8, further comprising:
receiving, by the server, a second data request from the terminal device, wherein the second data request comprises a data packet sequence number, and the data packet sequence number indicates a data packet of the N data packets that failed to be received by the terminal device; and sending, by the server, a data packet corresponding to the data packet sequence number to the terminal device.

13. The method according to claim 8, wherein the first data request is sent in a Constrained Application Protocol option (CoAP) option field, a Constrained Application Protocol query option (CoAP) query option field, or a non-acknowledged option NONACK option field.

14. A terminal device, comprising a memory, one or more processors, and one or more programs, wherein the one or more programs are stored in the memory, and the processor is configured to execute the one or more programs, to perform an Internet of Things data transmission, and the processor is further configured to execute a method comprising:

sending, a first data request to a server, wherein the first data request instructs the server to continuously send a plurality of data packets, the first data request comprises a quantity N of data packets, that the terminal device is capable of continuously receiving, and a time interval for sending two consecutive data packets, where N is an integer greater than 1; and continuously receiving, N data packets from the server, wherein the N data packets comprise at least one non-confirmable Constrained Application Protocol (NON) data packet, a sending time interval between two consecutive data packets in the N data packets, and the NON data packet indicates that the terminal device sending a receiving response from the terminal device to the server is unnecessary.

15. The terminal device according to claim 14, wherein a last data packet in the N data packets is a confirmable Constrained Application Protocol (CON) data packet; and the method further comprises:

sending, a response message to the server after receiving the CON data packet, wherein the response message to notify notifies the server that the terminal device is in a receiving state.

16. The terminal device according to claim 14, wherein before the sending the first data request to the server, the method further comprises:

sending a resource obtaining request to the server, wherein the resource obtaining request comprises an identifier of a requested data resource;

receiving a first data amount of the requested data resource from the server and a second data amount that is a part of the requested data resource and is included in each data packet, and each data packet includes the requested data resource; and determining the quantity N of the data packets based on the first data amount of the requested data resource and the second data amount that is the part of the requested data resource and that is carried in each data packet used to carry the data resource.

17. The terminal device according to claim 14, further comprising:

starting, by the terminal device, after receiving a data packet of the N data packets, a timer corresponding to a next data packet of the N data packets, and sending a retransmission request to the server in response to the timer expiring and the next data packet of the N data packets failing to be received, wherein the retransmission request instructs the server to retransmit the next data packet of the N data packets.

18. The terminal device according to claim 14, further comprising:

sending a second data request to the server, wherein the second data request comprises a data packet sequence number, and the data packet sequence number indicates a data packet of the N data packets that failed to be received by the terminal device; and receiving a data packet that is retransmitted by the server based on the second data request and that corresponds to the data packet sequence number.

19. The terminal device according to claim 14, wherein the first data request further comprises a start number of the N data packets, and the N data packets are data packets having corresponding incremented numbers from the start number.

20. The terminal device according to claim 14, wherein the first data request is sent in a Constrained Application Protocol option(CoAP) option field, a Constrained Application Protocol query option (CoAP) query option field, or a non-acknowledged option NONACK option field.

* * * * *